United States Patent [19]

Park

[11] Patent Number: 5,430,491
[45] Date of Patent: Jul. 4, 1995

[54] TELETEXT SIGNAL DETECTOR WITH A DISPLAY FOR INDICATING THE STATUS OF INDEX PAGES

[75] Inventor: Hyeon-jeong Park, Suwon, Rep. of Korea

[73] Assignee: Samsung Electronics Co. Ltd., Kyungki do, Rep. of Korea

[21] Appl. No.: 854,702

[22] Filed: Mar. 20, 1992

[30] Foreign Application Priority Data

Apr. 12, 1991 [KR] Rep. of Korea .............. 91-5924

[51] Int. Cl.⁶ ..................................... H04N 7/087
[52] U.S. Cl. ..................................... 348/468; 348/473
[58] Field of Search ............... 358/142, 146, 147, 403; H04N 7/04, 7/08, 7/087; 348/465, 468, 473, 478

[56] References Cited

U.S. PATENT DOCUMENTS

| 4,953,022 | 8/1990 | Bugg | 358/142 |
| 4,991,012 | 2/1991 | Yoshino | 348/588 |
| 4,992,871 | 2/1991 | Bensch | 358/142 |
| 5,038,212 | 8/1991 | Van Den Hombergh | 348/468 |

FOREIGN PATENT DOCUMENTS

| 406972 | 7/1990 | European Pat. Off. | H04N 7/087 |
| 312474 | 12/1990 | Japan | H04N 7/08 |
| 3622308 | 1/1988 | United Kingdom | H04N 7/087 |

OTHER PUBLICATIONS

UK Search Report, Jun. 23, 1992.

*Primary Examiner*—James J. Groody
*Assistant Examiner*—Chris Grant
*Attorney, Agent, or Firm*—Sughrue, Mion, Zinn, Macpeak & Seas

[57] ABSTRACT

A teletext signal detector and method including a plurality of field memories for storing by screens index page data, a user-designated page storage, an index page storage, an index page storing discriminator, and a display. The teletext signal detecting method comprises the steps of storing teletext information by screens, extracting only a plurality of index pages with respect to screens to sequentially store them, comparing the index pages with a user-designated page, and if they match, displaying the index page on a CRT, and if they do not match, providing a warning of the absence of the index page.

9 Claims, 2 Drawing Sheets

TELETEXT SIGNAL DETECTOR WITH A DISPLAY FOR INDICATING THE STATUS OF INDEX PAGES

BACKGROUND OF THE INVENTION

The present invention relates to a teletext signal detector and a detecting method thereof in a video apparatus which receives teletext signals. More particularly it relates to a teletext signal detector and a detecting method thereof which are capable of storing index pages among the teletext signals to detect rapidly desired teletext information.

The teletext signal currently used in a television is transmitted in a predetermined frequency via a teletext receiver by packaging index information, color information, data pattern information of pages' contents, etc. The teletext signal contains information to provide the user access to visual (text or graphics) information. According to a conventional method for detecting an index page among teletext signals, all of the teletext signals must be detected to ascertain the contents therein. Thus the detection time is greatly increased. Further, if a user inputs a non-existent page by mistake, the entire content of the teletext information should be ascertained and detected. However, because the detection time corresponds to the amount of information, when the amount of information is very large, the detection time is correspondingly very long.

SUMMARY OF THE INVENTION

Therefore, it is an object of the present invention to provide an apparatus which stores the contents of index pages among teletext signals in a memory and, if necessary, detects only the index page corresponding to desired teletext information, thereby rapidly detecting the desired teletext information.

It is another object of the present invention to provide a method which stores index pages among teletext signals and, if necessary, detects only the index page corresponding to the desired teletext information, thereby rapidly detecting the desired teletext information.

To accomplish the above and other objects, the teletext signal detector of the present invention comprises a teletext processor for processing a teletext signal among externally provided broadcast signals to display the results on a CRT, and a controller for operating the teletext processor according to key input. The teletext signal detector further comprises a plurality of memories for storing by screens index page data among the teletext information output from the teletext processor, a user-designated page storage for storing user-designated page data according to key input from the user, an index page storage for reading out an index page corresponding to the key designation from a plurality of index pages stored by screens in the memories and storing the read out index page, an index page storing discriminator for comparing a signal output from the index page storage with a signal output from the user-designated page storage to discriminate whether or not a desired index page is stored and supplying the result to the controller, and a display for, if the index page is not stored, receiving a control signal from the controller to display the fact that the index page is not stored.

The teletext signal detecting method according to the present invention includes the steps of processing a teletext signal among externally provided broadcast signals to display the teletext information on a CRT, storing teletext information screen by screen, extracting only a plurality of index pages with respect to each screen to sequentially store them, comparing the index pages with a user-designated page, and if they match, displaying the index page on the CRT, and if they do not match, warning of the absence of the index page.

BRIEF DESCRIPTION OF THE DRAWINGS

The above objects and other advantages of the present invention will become more apparent by the following detailed description of a preferred embodiment of the present invention with reference to the attached drawings in which.

DETAILED DESCRIPTION OF THE INVENTION

Figure 1:
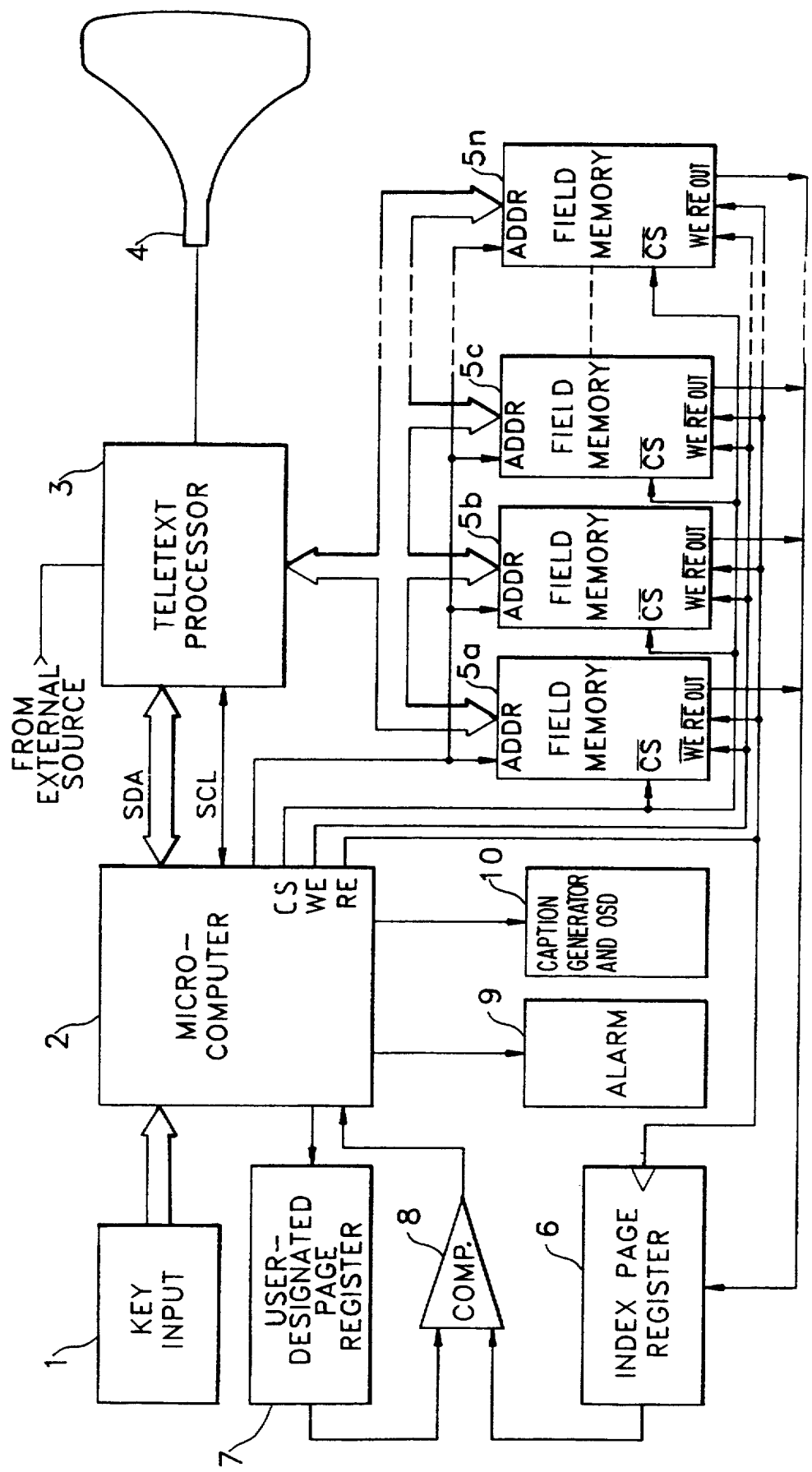
FIG. 1 is a block diagram of an embodiment of a teletext signal detector of the present invention.

Referring to FIG. 1, the output of a key input 1 is connected to an input of a microcomputer 2. The serial data input/output (I/O) port SDA and the serial clock port SCL of a teletext processor 3 are connected to the serial data I/O port and the serial clock port of a microcomputer 2, respectively. The output of the teletext processor 3 is connected to a CRT 4.

The data I/O ports of first to nth field memories 5a to 5n are connected to the data I/O port of the teletext processor 3, and the outputs of the field memories are connected to the input of an index page register 6. The chip select port $\overline{CS}$, write enable port $\overline{WE}$, and read enable port $\overline{RE}$ of the field memories are connected to the microcomputer's chip select port $\overline{CS}$, write enable port WE, and read enable port RE, respectively. The first input of a comparator 8 is connected to the output of the index page register 6, and a second input is connected to the output of a user-designated page register 7. The output of the comparator is coupled to an input of the microcomputer 2. The clock port of the index page register 6 is connected to the read enable port RE of the microcomputer, and the input of the user-designated page register 7 is connected to the data output of the microcomputer 2.

The inputs of an alarm 9 and a caption generator 10 are connected to control signal outputs of the microcomputer 2.

Now, operation of FIG. 1 will be described in greater detail.

First, when a teletext key is pressed among function keys provided on the key input 1, such as a key matrix or remote controller, the microcomputer 2 recognizes the teletext key to convert a television mode to a teletext mode. Here, the microcomputer 2 controls the teletext processor 3 for extracting only teletext information of a specified frequency band from an externally provided broadcast signal (a broadcasting station). The teletext processor 3 outputs the received (extracted) teletext information which is then displayed on the CRT. The teletext information inputted to the teletext processor 3 is formed as a data packet of index page information, color information, and data pattern information of pages' contents, etc.

Among such teletext information, when an index page is displayed, the screen is temporarily frozen by a pause key selected among the keys of the key input 1 provided on a remote controller or the television itself. Recognizing the pause key data, the microcomputer 2 supplies serial control data to the teletext processor 3 so that only the index page among the teletext information is sequentially written in the field memories 5a to 5n and, simultaneously, supplies a chip enable signal CS (memory driving control signal) to the plurality of field memories 5a to 5n which in turn store the index page information by screen.

At this stage, the field memories 5a to 5n store all the information concerning indexes and sub-indexes of the teletext displayed on the CRT 4 field by field. In addition, since the field memories 5a to 5n are composed of SRAMs, a user can freely re-store a new index page by eliminating the old one so that a plurality of index pages may be included. The index page information may be allocated to be stored in each field memory 5a to 5n field by field. That is, according to a read enable signal RE, the store index page information is read out from the field memories 5a to 5n in correspondence to the chip select signal CS so as to be sequentially stored in the index page register 6.

In order to display the desired index page information, when a memory index page key of the key input 1 is pressed, index pages stored in the plurality of field memories 5a to 5n are displayed on the CRT 4 through the teletext processor 3. When the entered key is for a user-designated page, the microcomputer 2 supplies user-designated page data to the user-designated register 7 and simultaneously supplies the read enable signal to the index page register 6 as its driving signal, thereby operating the register 6.

The index page data stored in the index page register 6 is inputted to the first input of the comparator 8, and the user-designated index page data is inputted to the second input. When the output of the comparator 8, which is composed of an XOR gate, is "0", the desired teletext information is obtained from the externally received teletext signals via the teletext processor 3. When the output is "1" the microcomputer 2 activates the alarm 9, causing the alarm to beep, and the caption generator 10 outputs data, clock, and strobe signals to display the caption "the page you are looking for is not found." The caption generator 10 is composed of an on-screen display (OSD). Thus, the alarm 9 and caption generator 10 allow rapid detection.

If the desired page is present without a beep, the teletext processor 3 searches the user-designated page and displays the contents onto the CRT 4, which leads to the rapid detection.

Figure 2:
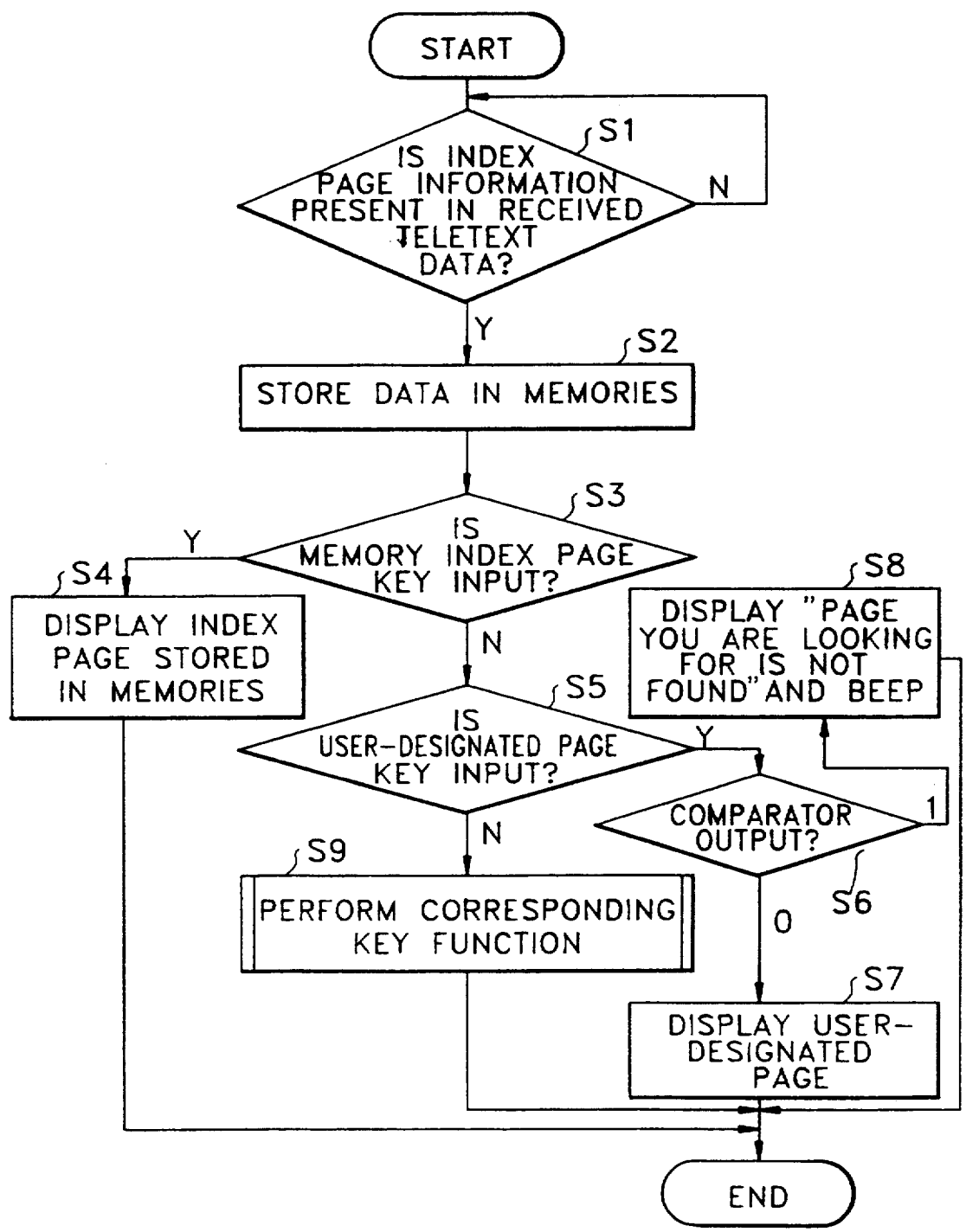
FIG. 2 is a flowchart illustrating the method of detecting a teletext signal which is performed in the microcomputer of FIG. 1.

FIG. 2 is a flowchart of a teletext signal detection method performed in the microcomputer shown in FIG. 1, which will be described with reference to the apparatus in FIG. 1.

First, in step S1, it is determined whether or not index page information is present in the externally received teletext signals (a broadcasting station). If the index page information is received, the field memories 5a to 5n are driven to store the information by fields according to a read enable signal in step S2. In step S3, the presence of an index page key input is decided. In step S4, the index page stored in memories 5a to 5n is displayed onto the CRT 4 through the teletext processor 3.

If the index page key is not inputted in steps 3 and a user-designated page key is inputted in step S5, the output of the comparator 8 will be "0" in step S6. In other words, when the user-designated page stored in the user-designated page register 7 matches the index page data stored in the index page register 6, the teletext processor 3 detects the user-designated page to display the contents on the CRT 4 in step S7.

If the output of the comparator 8 is "1" in step S6, the alarm 8 is sounded (beeps) and the caption "the page you are looking for is not found" is displayed on the OSD (step S8).

In step S5, if the user-designated page is not inputted, step S9 performs the function corresponding to the designated key.

As described in detail, the present invention stores only index pages among teletext information so as to detect only the desired index pages if necessary, thereby allowing rapid and efficient detection of the desired teletext information. While the invention has been particularly shown and described with reference to preferred embodiments thereof, it will be understood by those skilled in the art that various changes in form and details may be made therein without departing from the spirit and scope of the invention as defined by the appended claims.

What is claimed is:

1. A teletext signal detector comprising:
  a teletext processor for processing and extracting a teletext signal among externally supplied broadcast signals and displaying said teletext signal on a CRT as a series of screens;
  a controller for operating said teletext processor according to key inputs by a user;
  a plurality of memories for storing index page data on a screen-by-screen basis, the index pages being included within the teletext signal extracted by said teletext processor;
  a user-designated page storage for storing user-designated page data according to the key inputs by the user;
  an index page storage for storing and sequentially outputting page data which are sequentially read out from the index page data stored in said plurality of memories;
  an index page storing discriminator for comparing the sequentially outputted page data from said index page storage with a signal output from said user-designated page storage to discriminate whether said user-designated page data corresponds to the page data stored by said index page storage and supplying the result to said controller; and
  an additional display for, if the page data corresponding to the user-designated page data is not stored, receiving a control signal from said controller to display the fact that the user-designated page data is not stored.

2. The teletext signal detector as claimed in claim 1, further comprising an alarm for generating an audible warning if the user-designated page data are not stored during detection.

3. The teletext signal detector as claimed in claim 1, wherein said display displays a visual warning if the user-designated page data are not stored during detection.

4. The teletext signal detector as claimed in claim 1, further comprising an alarm for generating an audible warning, and wherein said additional display displays a visual warning if the user-designated page data are not stored during detection.

5. The teletext signal detector as claimed in claim 1, wherein said index page storing discriminator is composed of a comparator which comprises an exclusive OR logic device.

6. The teletext signal detector as claimed in claim 1, wherein said memories comprise SRAMs which erase the present contents if a new index page is received, and store the new index page.

7. A teletext signal detecting method comprising the steps of:

processing and extracting a teletext signal from among externally provided broadcast signals, and displaying the teletext signal on a CRT as a series of screens;

storing in a plurality of memories, by screens, index page data of the processed teletext signal;

storing in a user-designated page storage user-designated page data according to a key input from the user;

sequentially reading from an index page storage index pages corresponding to the key input from a plurality of index page information stored by screens in said memories and storing only one of the index pages at a time;

comparing a signal output from said index page storage, which is representative of a first complete index page number, with a signal output from said user-designated page storage, which is representative of a second complete index page number, to discriminate whether or not a desired index page is stored in said index page storage;

displaying on an additional display, if the desired index page is not stored, an indication that the index page is not stored.

8. A teletext signal detecting method as recited in claim 7, wherein said indication of the absence of said index page comprises the step of activating an alarm to provide an audible sound to alert a user that said index page has not been located.

9. A teletext signal detecting method as recited in claim 7, wherein said indication of the absence of said index page comprises the step of displaying an indication that said index page has not been located.

* * * * *